United States Patent [19]

Dahlin

[11] 4,016,988

[45] Apr. 12, 1977

[54] APPARATUS FOR INTRODUCING WASTE OR THE LIKE INTO A COLLECTING CONTAINER

[75] Inventor: Åke Bertil Ingemar Dahlin, Blomstermala, Sweden

[73] Assignee: Norba Aktiebolag, Blomstermala, Sweden

[22] Filed: Dec. 1, 1975

[21] Appl. No.: 636,378

[30] Foreign Application Priority Data

Dec. 9, 1974 Sweden ............................ 7415348

[52] U.S. Cl. ............................. 214/17 C; 214/503; 214/83.3; 100/264

[51] Int. Cl.² ......................................... B65G 65/30

[58] Field of Search ............... 214/83.3, 503, 1 BB, 214/17 C; 100/264

[56] References Cited

UNITED STATES PATENTS

| | | | |
|---|---|---|---|
| 2,837,230 | 6/1958 | Herterich | 214/503 |
| 3,254,782 | 6/1966 | Mold | 214/503 |
| 3,696,951 | 6/1972 | Toppins | 214/83.3 |
| 3,872,984 | 3/1975 | Moser et al. | 214/503 |

*Primary Examiner*—Robert J. Spar
*Assistant Examiner*—Lawrence E. Williams
*Attorney, Agent, or Firm*—Fulwider Patton Rieber Lee & Utecht

[57] ABSTRACT

An apparatus for introducing waste or the like into a collecting container is associated with a load hopper adapted to receive the waste, and comprises a pair of gripping members for transferring the waste from the load hopper to the collecting container. The gripping members, which are adapted to grip and to compress consecutive portions of waste between themselves and forward these portions to the collecting container, are movable, preferably synchronously and substantially in a common plane, towards and away from each other, as well as towards and away from the collecting container.

9 Claims, 11 Drawing Figures

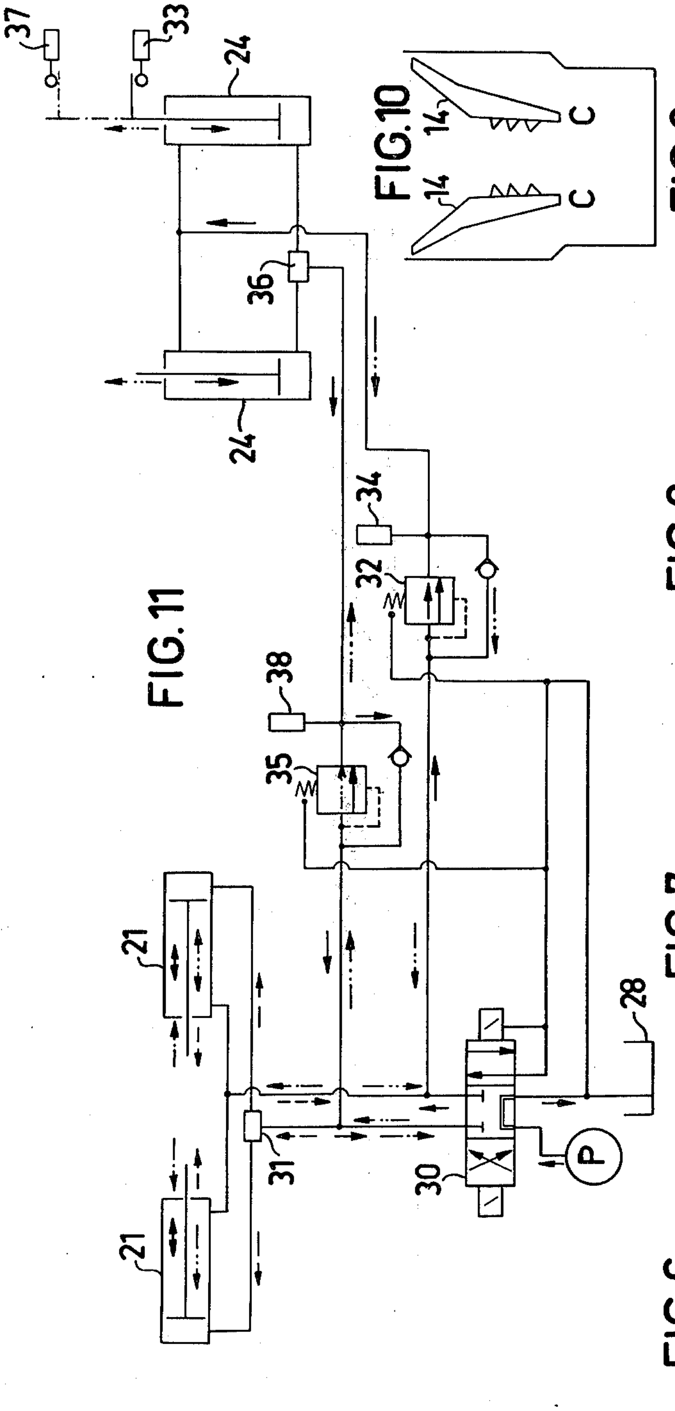
FIG.11
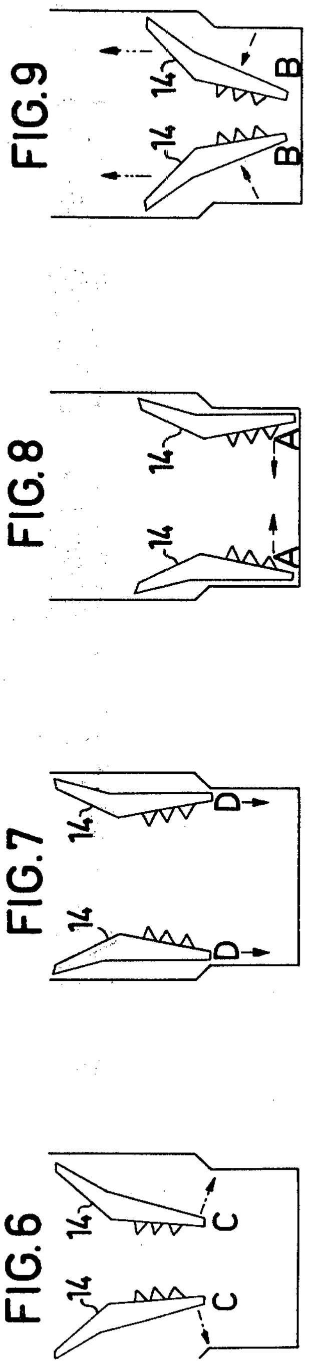
FIG.10
FIG.9
FIG.8
FIG.7
FIG.6

APPARATUS FOR INTRODUCING WASTE OR THE LIKE INTO A COLLECTING CONTAINER

BACKGROUND OF THE INVENTION

The invention generally relates to an apparatus for introducing waste or refuse into a collecting container or the like arranged e.g. on a vehicle, through a load hopper adapted to receive the waste and comprising means for transferring the waste to the collecting container. Such apparatus of the prior art, as exemplified by the U.S. Pat. No. 2,837,230, comprise a packing plate, which moves in a plane arc backwards over a loading hopper and in so doing cuts off the flow of garbage from a bin or container to the hopper when feeding in a batch of refuse from the hopper into the collecting container during its forward stroke.

A circumstance, which has to be taken into consideration when improving such refuse handling apparatus, is the composition of the waste that is to be handled. Thus, in addition to ordinary and coarser domestic and store waste there is nowadays an increasing rate of industrial waste. Bearing this in mind, the principal object of the invention is to provide a feeding-in apparatus of the kind in question, which makes possible a more rational and effective handling of such waste in conjunction with removing or transporting away thereof.

A particular object of the invention is to provide a substantially continuously operating feeding-in apparatus, which carries out precompressing, crushing and compacting without cutting off the stream of waste, before the waste or refuse is finally compressed in the collecting container, whereby a rapid introduction in combination with a high degree of compression is made possible.

SUMMARY OF THE INVENTION

These and other objects are attained thanks to the fact that said means for transferring the waste to the collecting container according to the invention comprise a pair of gripping members, which are movable, preferably synchronously, substantially in a common plane, towards and away from the collecting container, as well as towards and away from each other, substantially perpendicularly to their first mentioned movement, said means being adapted to grip and to compress the portion of waste between themselves and in conjunction herewith forward it to the collecting container.

BRIEF DESCRIPTION OF THE DRAWINGS

Further features and advantages will become apparent from the following detailed description and the annexed drawings, which diagrammatically and as non-limiting example illustrate an embodiment of the invention, which is preferred at present.

FIGS. 6–10 are diagrammatic representations of the position of the gripping members during different phases of a cycle of operation.

FIG. 11 is a simplified diagram of the pressure fluid system.

DESCRIPTION OF THE PREFERRED EMBODIMENT

Figure 1:
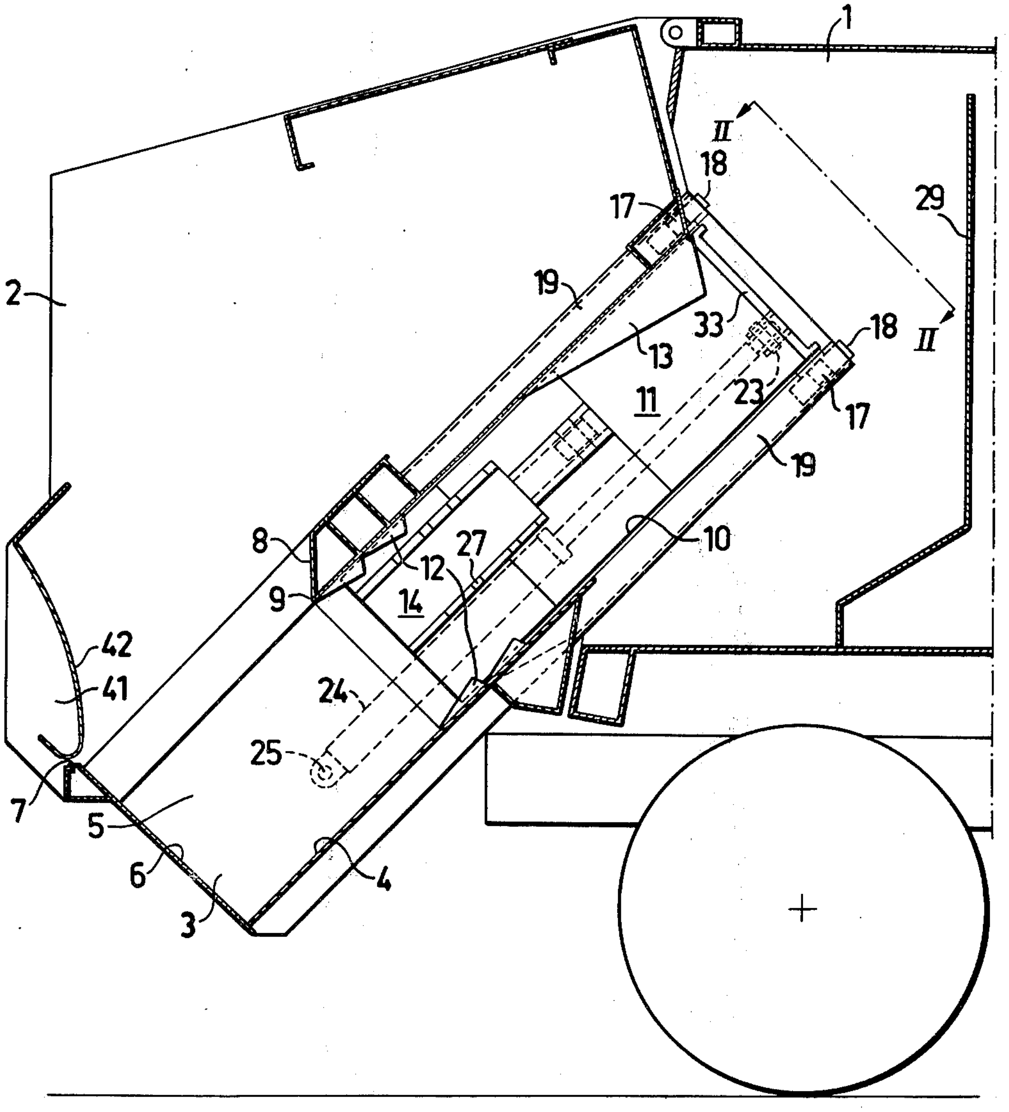
FIG. 1 of the drawings is a longitudinal section through the rear part of a refuse collecting van.

In the Figures there is shown a collecting container 1, which is arranged on a refuse collecting van and is combined with an emptying hood 2 and a load hopper 3. The emptying hood has an inlet opening 41 (FIGS. 1 and 3), which may be provided with bin holders 42 for the emptying of larger bins or containers. The load hopper 3 comprises a bottom 4, side walls 5 (FIGS. 1 and 2), a rear wall 6 having an emptying ramp 7 and an upper part 8 having a breaking edge 9. The bottom 4 and the upper part 8 of the hopper 3 define a feed shaft 11 and are provided with catch projections or teeth 12, which are adapted to desintegrate the refuse and to prevent it from sliding back into the load hopper 3. In its lower portion the inner end of the shaft 11 has an outlet opening 10, which is defined by the botton 4 (FIGS. 1 and 5) and opens into the collecting container 1. Just opposite the opening 10 the upper portion of the shaft 11 is provided with a guiding cone 13 (FIGS. 1, 2, 3), which is adapted to compress and to guide the refuse on its way into the collecting container 1.

Figure 2:
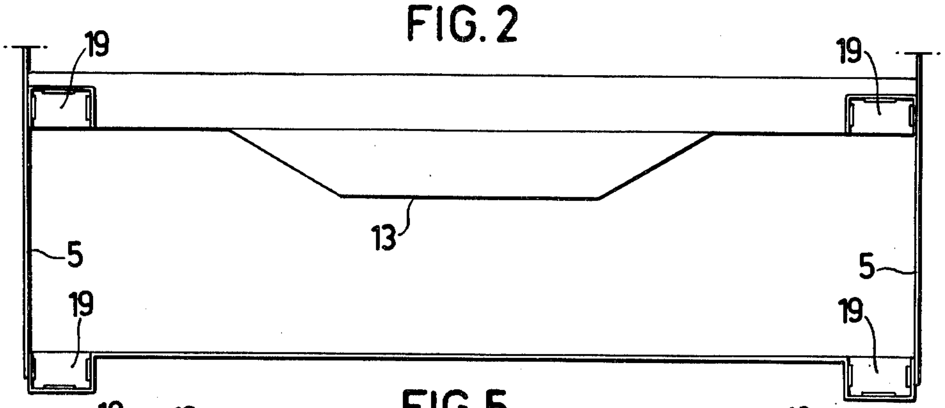
FIG. 2 is a simplified end view of the load hopper as seen in the direction of the arrow II—II in FIG. 1.
Figure 5:
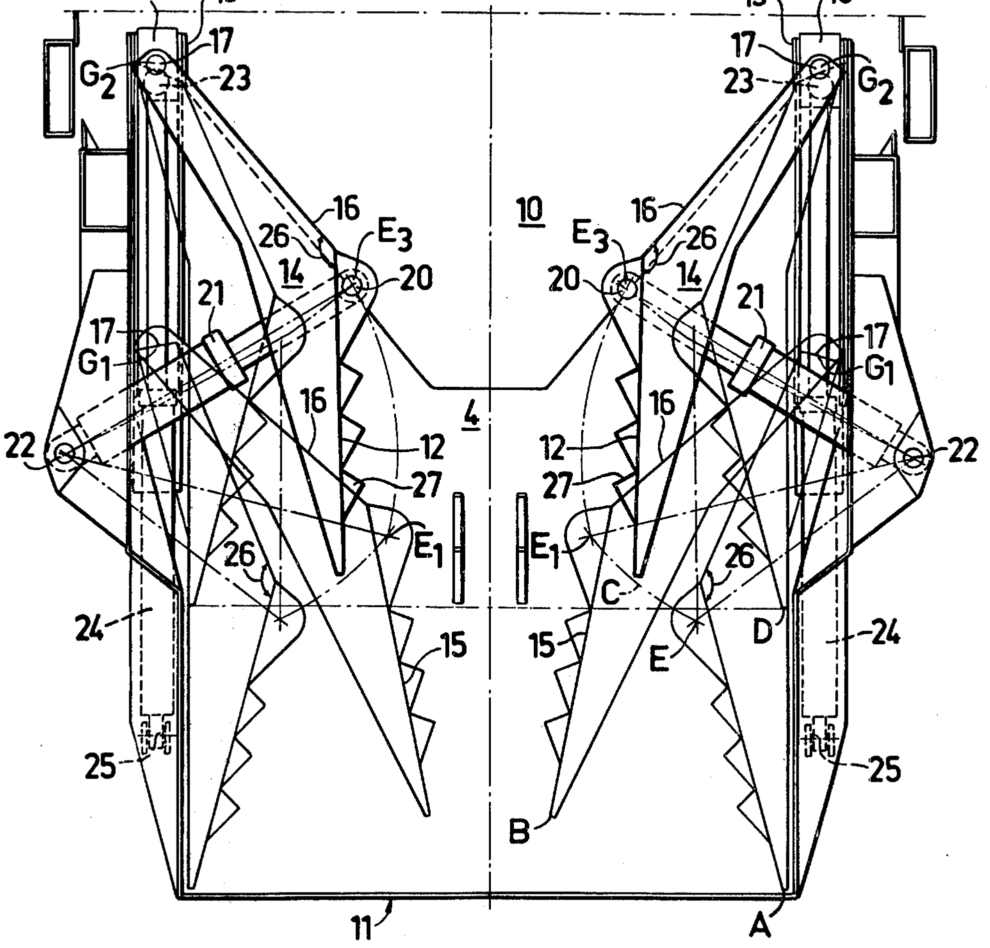
FIG. 5 is a plan view illustrating the two gripping members and their associated parts.
Figure 3:
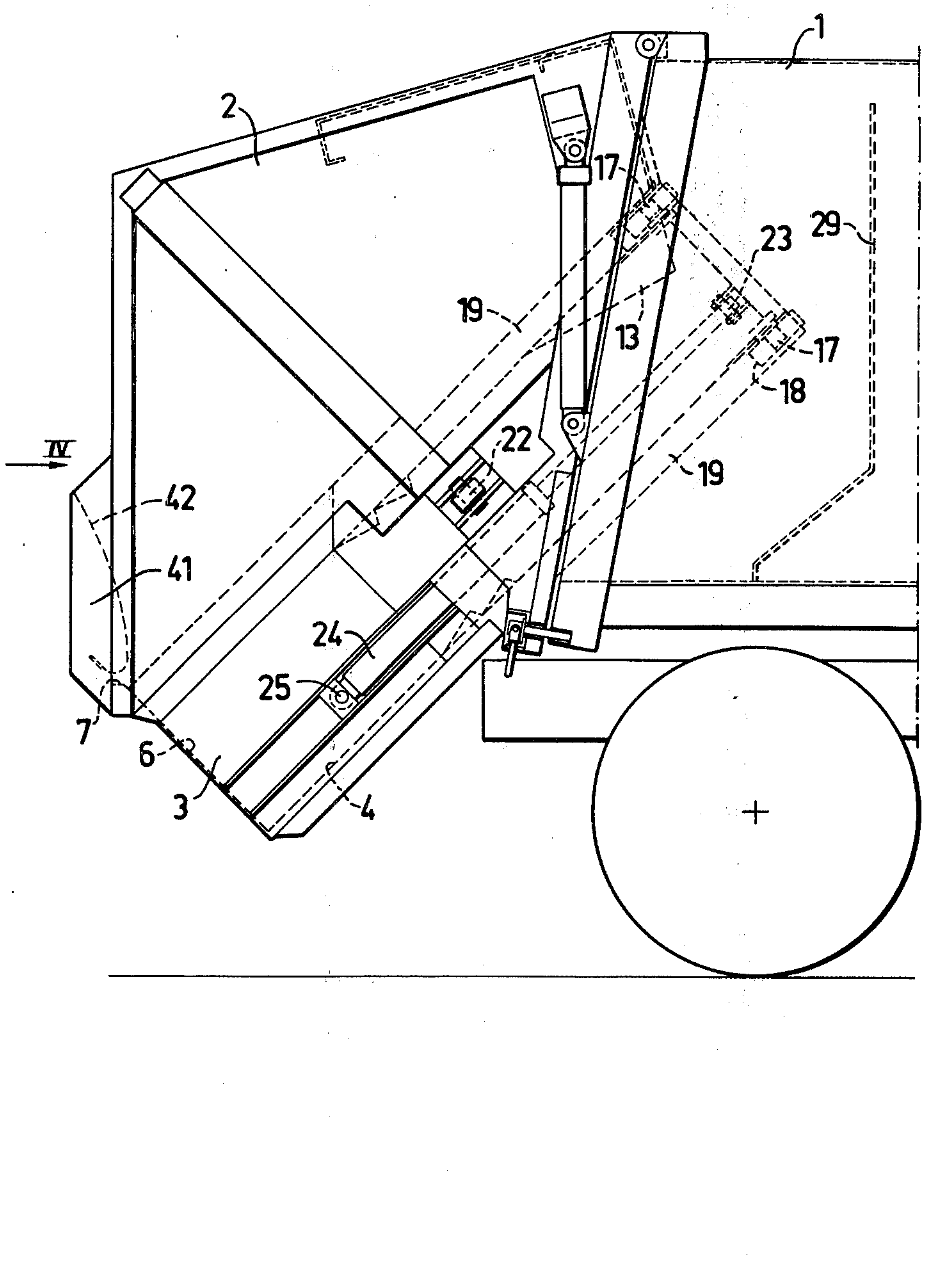
FIG. 3 is a side view corresponding to FIG. 1.
Figure 4:
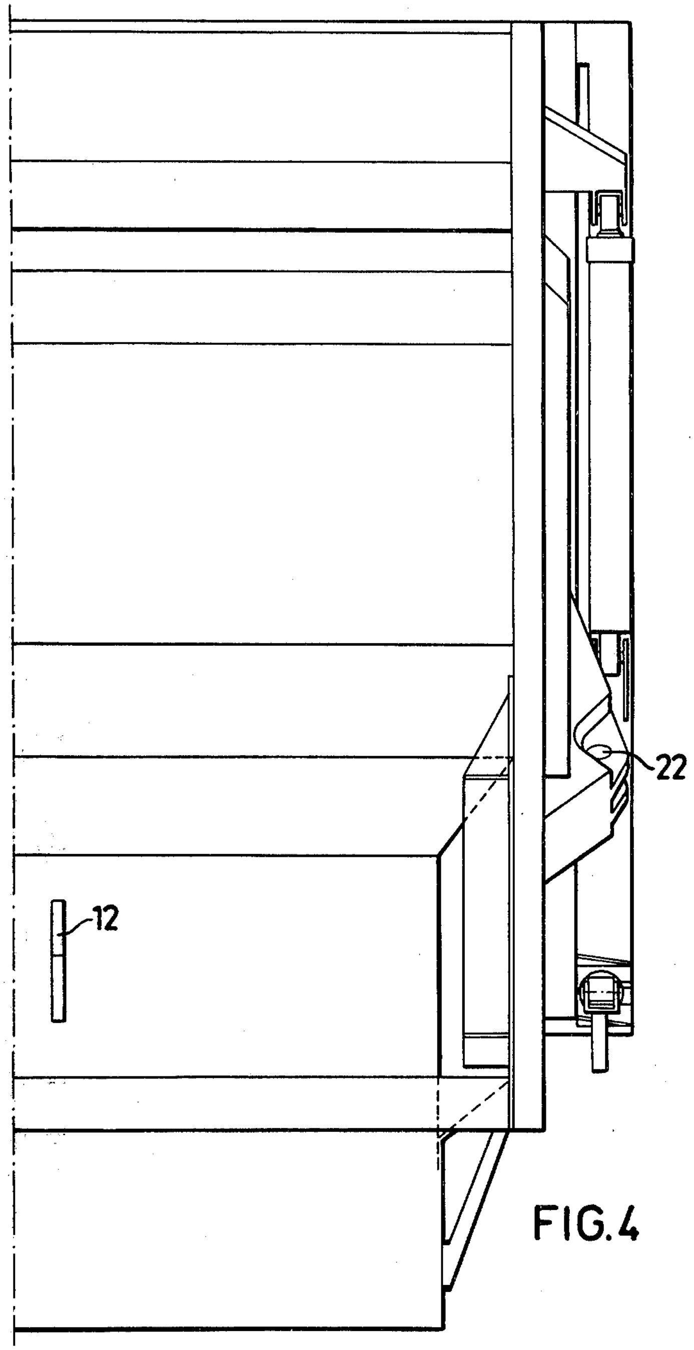
FIG. 4 is an end view of half of the load hopper on a larger scale as seen in the direction of the arrow IV in FIG. 3, to which FIG. 4 corresponds.

For transferring the refuse from the load hopper 3 into the collecting container 1 there are provided two movable gripping members 14, which are shown in four different positions in FIG. 5. These gripping members 14 have the shape of one-armed bell cranks, whose lever portions form an obtuse angle 26 (FIG. 5) with each other. At their one outer lever end the gripping members 14 are rotatably journalled through stub shafts 17 (FIGS. 1 and 5) in a pair of sliding blocks 18, which are movable back and forth in individual guide members 19. Two hydraulic pressure fluid motors (piston cylinder + piston with piston rod) 24, which are pivotable on stub shafts 23 and 25, are provided for reciprocating the gripping members 14 and their appurtenant sliding blocks 18 in their guide members 19 (FIGS. 2 and 5). The gripping members 14 are provided with stub shafts 20, by means of which they are coupled to a second pair of pressure fluid motors 21 (piston cylinder + piston with piston rod), which are hydraulic in the illustrated embodiment and which are pivotally journalled on stub shafts 22 and provided for rotating the gripping members or bell cranks 14. Those surfaces 15 of the respective gripping members 14, which face each other and are located between the vertex and the free end of the bell cranks, are provided with teeth 27, which are intended to improve the refuse holding capability of the gripping members 14.

The circuit diagram of the hydraulic system, by means of which the gripping members 14 are operated, is illustrated in FIG. 11. Therein, we find the hydraulic motors 21 and 24, which are connected to each other and to the other members of the hydraulic system, which are illustrated by conventional symbols, by means of non-referenced conduits. In FIG. 11 P is a pump, 28 an oil reservoir, 30 a control valve having three setting positions (left-hand, central and right-hand position in the symbolical Figure), 31 and 36 are flow dividers, 32 and 35 are sequential valves, 33 and 37 are limit switches and 34 and 38 are pressure governors or switches.

As is diagrammatically illustrated in FIGS. 6–10 the apparatus described above operates in the following way, the direction of flow of the pressure fluid in FIG. 11 being designated by dash-dot arrows when the gripping members move from the position according to FIG. 6 to the position according to FIG. 7, by solid arrows at the movement from FIG. 7 to FIG. 8, by dash arrows at the movement from FIG. 8 to FIG. 9 and by dash-dot-dot arrows at the movement from FIG. 9 to FIG. 10.

The cycle of operations is supposed to start, when the gripping members 14 are located substantially in the point C in FIG. 6, the control valve 30 then being shifted from its central or neutral position shown in FIG. 11 to its left-hand position. Then, the pressure fluid flows in the direction of the dash-dot arrows, the pistons in the hydraulic motors 21 in FIG. 11 consequently being separated to the position shown therein. Hereby, the gripping members 14 are pivoted clockwise and anti-clockwise, respectively, from each other into the position D illustrated in FIG. 7. At a predetermined pressure in the hydraulic system, the sequence valve 32 admits supply of pressure fluid to the upper end of the cylinders of the pressure fluid motors 24 in FIG. 1, so that the pistons move downwards therein. Hereby, the gripping members are transferred from the position D in FIG. 7 to the position A in FIG. 8. The oil pressure in the hydraulic motors 21 is maintained, so that their pistons have the possibility of moving in both directions under the influence of pressure, as is indicated by the solid double arrows in FIG. 11. When the position A in FIGS. 5 and 8 has been attained and triggers the limit switch 33, the control valve 30 is switched to its right-hand position for initiating the return movement of the pistons in the pressure fluid motors 21, so that the pressure fluid flows in the direction of the dash arrows and the gripping members 14 are displaced in the direction from A to B (FIGS. 5, 8, 9). Hereby, the gripping members 14 seize the refuse or waste with their teeth 27 and carry out the pre-crushing thereof during their movement towards each other. If the gripping members should not reach the position A on account of un-deformable, obstructing refuse objects, the pressure switch 34 initiates the movement from A to B instead of the limit switch 33. When the position B has been attained, the sequence valve 35 initiates, at a set maximum pressure, the flow of the pressure medium in the direction of the dash-dot-dot arrows and the rising movement of the pistons in the pressure fluid motors 24 in FIG. 11 through the flow divider 36 for bringing about the movement of the gripping members to the position in FIGS. 5 and 10. During this movement the refuse is held by the teeth 27 of the gripping members 14, which transfer the refuse through the shaft 11, while compressing the refuse, further compressing thereof being brought about by the projections 12 and the guide cone 13, before the refuse is introduced through the opening 10 (FIG. 5) into the collecting container 1, where it is finally compressed against a press wall 29 (FIGS. 1 and 2) or the like. During the movement from A to B and at the beginning of the movement from B to C the surfaces 15 are pressed towards each other and thereby a higher compression under an increased force past the breaking edge 9 is attained also by the increase in moment which takes place at the movement and the change of position of the point 22 in relation to $G_1$ and $G_2$, respectively, and $E_1$ and $E_3$, respectively. Thanks to the fact that the gripping members 14 are designed with the angle 26, the two opposing, vertical surfaces 16 form a transporting and compressing means for further transport and compression of such refuse as has been advanced in the shaft 11 during the preceding cycle of operations, at the movement of the gripping members towards the position shown in FIG. 10.

During the movement of the gripping members from B to C oil pressure in the hydraulic motors 21 is maintained with possibility for their pistons to reciprocate or move back and forth under the influence of pressure, as is indicated by the dash-dot-dot double-arrows, until the limit switch 37 or — if the position C should not be reached on account of an undeformable refuse object, which blocks the movement of the gripping members 14 — the pressure switch 38 initiates a new start of the operation cycle described above.

As is evident from the above, the operation cycle of the gripping members 14 is not bound to follow the said points C-D-A-B-C, in that the movement of the gripping members may be obstructed by the refuse, thanks to the fact that the hydraulic system is so designed that the operation cycle is completed even though the different end positions of the gripping members should not be reached. In this case the hydraulic motor 21 is subjected to a continued pressure by means of a sequence valve 35, which is arranged in such a manner that the piston of the hydraulic motor 21 and its fastening 20 can move outwards and inwards in dependence of the varying load upon the gripping members during their movement from B to C (compare the dash-dot-dot arrows in FIG. 11).

By this system, where the gripping members can seize the "refuse flow" from the sides at the emptying of large containers, a better mode of operation is attained than by prior devices known up to the present, which comprise a pressing plate, which moves in a plane arc backwards and on account hereof has to "cut off" the flow of garbage from the bin or container before the feeding-in into the collecting container.

The embodiment described above and illustrated in the drawings is, of course, to be regarded merely as non-limiting example and can as to its details be modified in several ways within the scope of the following claims. Thus, the shaft 11 with its upper part 8 and the gripping members 14 with their teeth 27, the latch blocks 12 and the guiding cone 13 may have another shape, and the governing of the gripping members may be accomplished in combination with link movements instead of by means of guides. Furthermore, the illustrated hydraulic equipment may be replaced by another movement system, e.g. by hydraulic or electric motors with pinions and racks or the like. In addition hereto, the feeding-in apparatus according to the invention may be utilized in connection with stationary compressing systems as well as for other material than waste or refuse, e.g. as a stationary crusher or a transport apparatus for industrial purposes.

What I claim is:

1. Apparatus for introducing refuse into a collecting container, comprising

- a load hopper forming a shaft leading to said collecting container and having an inlet opening for receiving refuse;
- a pair of gripping members, which are movable in said shaft;
- means for moving said gripping members towards each other, when they are positioned in the inlet opening end of said shaft to hereby grip and compress a portion of refuse between themselves;

means for advancing said gripping members and said refuse portion held by them towards said collecting container;

means for releasing the hold of said gripping members on said refuse portion and for separating said gripping members from each other, when they have reached the collecting container end of said shaft to hereby introduce said refuse portion into said collecting container; and means for returning said gripping members to the inlet opening end of said shaft.

2. Apparatus according to claim 1, in which said load hopper has a refuse inlet opening with a breaking edge for breaking to pieces objects projecting beyond said inlet opening.

3. Apparatus according to claim 1, in which said shaft has at least one wall, which is provided with projections for preventing refuse from taking part in the return movement of said gripping members in the direction from said collecting container end of said shaft towards its inlet opening end.

4. Apparatus according to claim 1, in which the cross dimension of said shaft tapers in the direction of the collecting container to hereby assist in compressing and guiding said refuse portions.

5. Apparatus according to claim 1, in which said shaft has a bottom having a substantially trapezoidal outlet opening, which leads to said collecting container and has the shorter one of its two parallel sides located closer to said inlet opening than the longer one of its parallel sides.

6. Apparatus according to claim 5, in which a movable wall member is provided in the collecting container and said gripping members are adapted to compress refuse, which has been fed out, at least in part, through said outlet opening, against said wall member.

7. Apparatus according to claim 1, comprising at least one pressure fluid motor, which is coupled to one of the free ends of each of said gripping members, which have the shape of bell cranks having an obtuse vertex, for reciprocating each of said ends along an elongated guide member, and at least one second pressure fluid motor, which is coupled to each of said bell cranks substantially at their respective vertices for pivoting said bell cranks towards and away from each other.

8. Apparatus according to claim 7, in which that one of the lever portions of the respective bell cranks, which is coupled to a pressure fluid motor only at the vertex of the bell crank, is provided with projections, which are directed substantially towards said one lever portion of the other bell crank.

9. Apparatus according to claim 7, comprising a pressure fluid system, in which said pressure fluid motors of the gripping members are comprised and which also comprises means, including at least one control valve, for maintaining a substantially continuous cycle of operation even though said gripping members occasionally should not reach one of their end positions.

* * * * *